(No Model.)
J. BRIDGE.
CAR COUPLING LINK.
No. 260,831. Patented July 11, 1882.
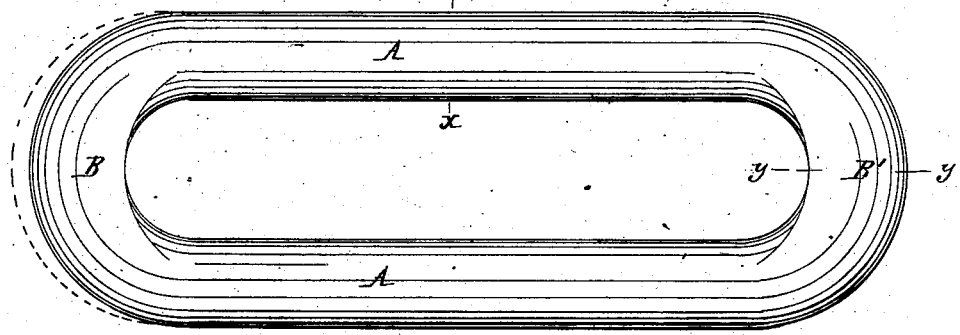
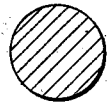
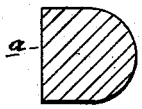
Attest:
A. Barthel
Charles J. Hunt
Inventor:
John Bridge
per Thos. S. Sprague,
Atty

UNITED STATES PATENT OFFICE.

JOHN BRIDGE, OF DETROIT, MICHIGAN.

CAR-COUPLING LINK.

SPECIFICATION forming part of Letters Patent No. 260,831, dated July 11, 1882.

Application filed February 21, 1882. (No model.)

*To all whom it may concern:*

Be it known that I, JOHN BRIDGE, of Detroit, in the county of Wayne and State of Michigan, have invented new and useful Improvements in Railway-Car Links; and I do hereby declare that the following is a full, clear, and exact description thereof, reference being had to the accompanying drawings, which form a part of this specification.

The nature of this invention relates to certain new and useful improvements in links such as are usually employed, with suitable pins, to couple railway-cars together.

The invention consists in constructing the link with round sides or legs and with D-shaped ends, the vertical section or face of the D being presented inward to afford a larger bearing-surface against the side of the pin, thereby avoiding many of the difficulties and much of the wear which attend the use of the ordinary link and pin, all as more fully hereinafter described. I have in a separate application of even date with this described and claimed a machine by which this link is made.

Figure 1 is a representation of my improved link. Fig. 2 is a cross-section on line *x x* in Fig. 1. Fig. 3 is a cross-section on line *y y* in Fig. 1.

In the accompanying drawings there is shown a link made of round iron, in which the legs or sides A are round and of the same diameter as the rod of which the link is made, while the ends B B' are D-shaped, with the flattened or vertical sides *a* of the ends presented inward and toward each other.

The rod of which the link is formed, being cut to the proper length, is bent at its center, as at B, until the legs or sides are parallel to each other. The two free ends are then bent inwardly toward each other and welded, a die or dies being employed which leave the welded end of the link in the D shape shown in Fig. 3. The opposite end is upset against a flat-faced die or dies, which gives the similar D shape to this end of the link.

I am aware that links are made with both legs and both ends round.

I am also aware that links are also made of D-shaped iron, so that the inner sides of the link are flat and present vertical sides. In this latter case there is a waste of iron without acquiring any necessary additional strength. In my improvement this waste of iron is prevented, while the relative strength of the legs or sides and ends is preserved and made uniform.

I am aware of Patent No. 67,311, and I do not therefore claim a flat-sided link having square side bars, and with its ends straight on the inside and curved on the outside.

What I claim is—

A car-link having its side-bars parallel to each other and circular, and its ends D-shaped in cross-section, whereby the inner surfaces of the ends are vertical and parallel to each other and the entire outer surface of the link convex, substantially as and for the purpose specified.

JOHN BRIDGE.

Witnesses:
CHARLES J. HUNT,
E. SCULLY.